US009454412B2

(12) United States Patent
Rosier

(10) Patent No.: US 9,454,412 B2
(45) Date of Patent: Sep. 27, 2016

(54) SYSTEMS AND METHODS FOR CLASSIFYING AND ANALYZING RUNTIME EVENTS

(71) Applicant: Benefitfocus.com, Inc., Charleston, SC (US)

(72) Inventor: Michael Rosier, Mt. Pleasant, SC (US)

(73) Assignee: Benefitfocus.com, Inc., Charleston, SC (US)

( * ) Notice: Subject to any disclaimer, the term of this patent is extended or adjusted under 35 U.S.C. 154(b) by 0 days.

(21) Appl. No.: 14/506,159

(22) Filed: Oct. 3, 2014

(65) Prior Publication Data

US 2016/0098304 A1 Apr. 7, 2016

(51) Int. Cl.
*G06F 9/44* (2006.01)
*G06F 9/54* (2006.01)

(52) U.S. Cl.
CPC .................................... *G06F 9/542* (2013.01)

(58) Field of Classification Search
None
See application file for complete search history.

(56) References Cited

U.S. PATENT DOCUMENTS

| | | | | |
|---|---|---|---|---|
| 4,987,539 | A * | 1/1991 | Moore | B07C 5/3427 209/579 |
| 5,724,272 | A * | 3/1998 | Mitchell | G06F 8/20 702/123 |
| 6,385,609 | B1 * | 5/2002 | Barshefsky | H04Q 3/0087 |
| 2005/0283680 | A1 * | 12/2005 | Kobayashi | G06F 11/3636 714/39 |
| 2007/0130219 | A1 | 6/2007 | Lin et al. | |
| 2007/0136455 | A1 | 6/2007 | Lee et al. | |
| 2009/0106775 | A1 | 4/2009 | Cermak et al. | |
| 2010/0287416 | A1 * | 11/2010 | Shacham | G06F 11/0709 714/39 |
| 2011/0137942 | A1 | 6/2011 | Yan et al. | |
| 2014/0237453 | A1 * | 8/2014 | Hulick, Jr. | G06F 8/70 717/127 |
| 2014/0358941 | A1 * | 12/2014 | Adams | G06F 17/30303 707/748 |

FOREIGN PATENT DOCUMENTS

JP H11224214 A 8/1999

OTHER PUBLICATIONS

Abhishek Gattani et al. "Entity Extraction, Linking, Classification, and Taggingfor Social Media: A WikipediaBased Approach" 2013.*
International Search Report and Written Opinion for PCT/US2015/048822 filed Sep. 8, 2015, and mailed from the International Searching Authority on Jan. 4, 2016, 12 pgs.

* cited by examiner

*Primary Examiner* — Lechi Truong
*Assistant Examiner* — Abdou Seye
(74) *Attorney, Agent, or Firm* — Stoel Rives LLP

(57) ABSTRACT

A system may be able classify events that occur during the runtime of applications (e.g., exceptions). The system may receive an indication of the event and may classify the event based on a comparison with elements of a classification data structure. The classification data structure may be a hierarchical data structure, and child elements may inherit characteristics from parent elements. Based on the classification, the system may perform one or more actions, which may be specified by the elements of the data structure. For example, the system may provide notifications to administrators and/or user, may attempt to recover from the event, and/or the like. Each event may be associated with a unique identifier so the user can more easily identify the event to support personnel. The system may include analysis tools to assist administrators in tracking events and identifying which events are most important.

18 Claims, 11 Drawing Sheets

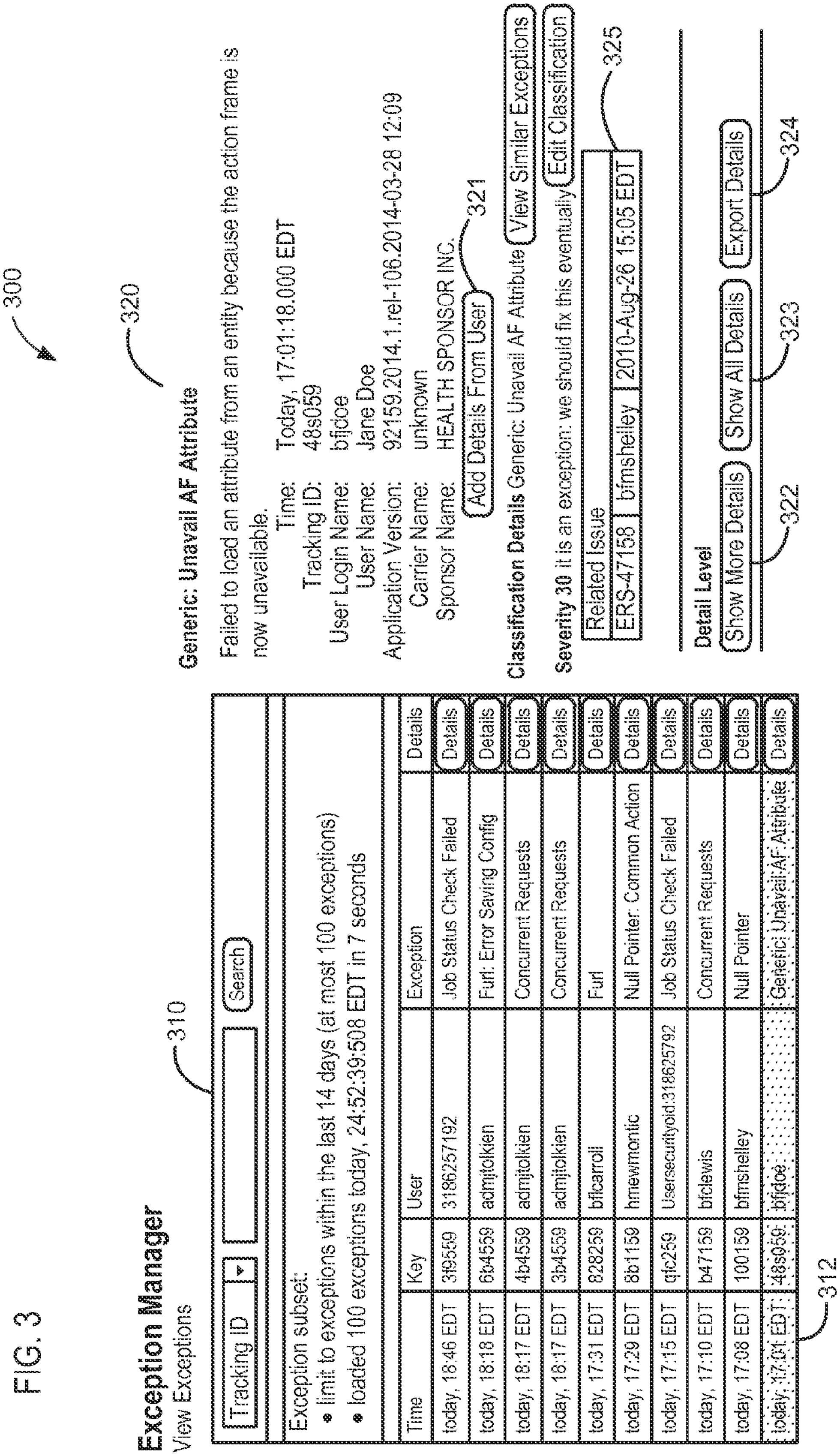

FIG. 3

Exception Manager
View Exceptions

Tracking ID ▼ [          ] (Search) — 310

Exception subset:
- limit to exceptions within the last 14 days (at most 100 exceptions)
- loaded 100 exceptions today, 24:52:39.508 EDT in 7 seconds

| Time | Key | User | Exception | |
|---|---|---|---|---|
| today, 18:46 EDT | 3f9559 | 3186257192 | Job Status Check Failed | Details |
| today, 18:18 EDT | 6b4559 | admjtolkien | Furl: Error Saving Config | Details |
| today, 18:17 EDT | 4b4559 | admjtolkien | Concurrent Requests | Details |
| today, 18:17 EDT | 3b4559 | admjtolkien | Concurrent Requests | Details |
| today, 17:31 EDT | 828259 | bflcarroll | Furl | Details |
| today, 17:29 EDT | 8b1159 | hrnewmontic | Null Pointer: Common Action | Details |
| today, 17:15 EDT | qfc259 | Usersecurityoid:3186257192 | Job Status Check Failed | Details |
| today, 17:10 EDT | b47159 | bfclewis | Concurrent Requests | Details |
| today, 17:08 EDT | 100159 | bfmshelley | Null Pointer | Details |
| today, 17:01 EDT | 48s059 | bfjdoe | Generic: Unavail AF Attribute | Details |

— 312

— 320
Generic: Unavail AF Attribute
Failed to load an attribute from an entity because the action frame is now unavailable.

Time: Today, 17:01:18.000 EDT
Tracking ID: 48s059
User Login Name: bfjdoe
User Name: Jane Doe
Application Version: 92159.2014.1.rel-106.2014-03-28 12:09
Carrier Name: unknown
Sponsor Name: HEALTH SPONSOR INC.

(Add Details From User) — 321

Classification Details Generic: Unavail AF Attribute (View Similar Exceptions) (Edit Classification)

Severity 30 it is an exception: we should fix this eventually — 325

Related Issue | ERS-47158 | bfmshelley | 2010-Aug-26 15:05 EDT

Detail Level
(Show More Details) (Show All Details) (Export Details)
   — 322        — 323            — 324

Figure 4:
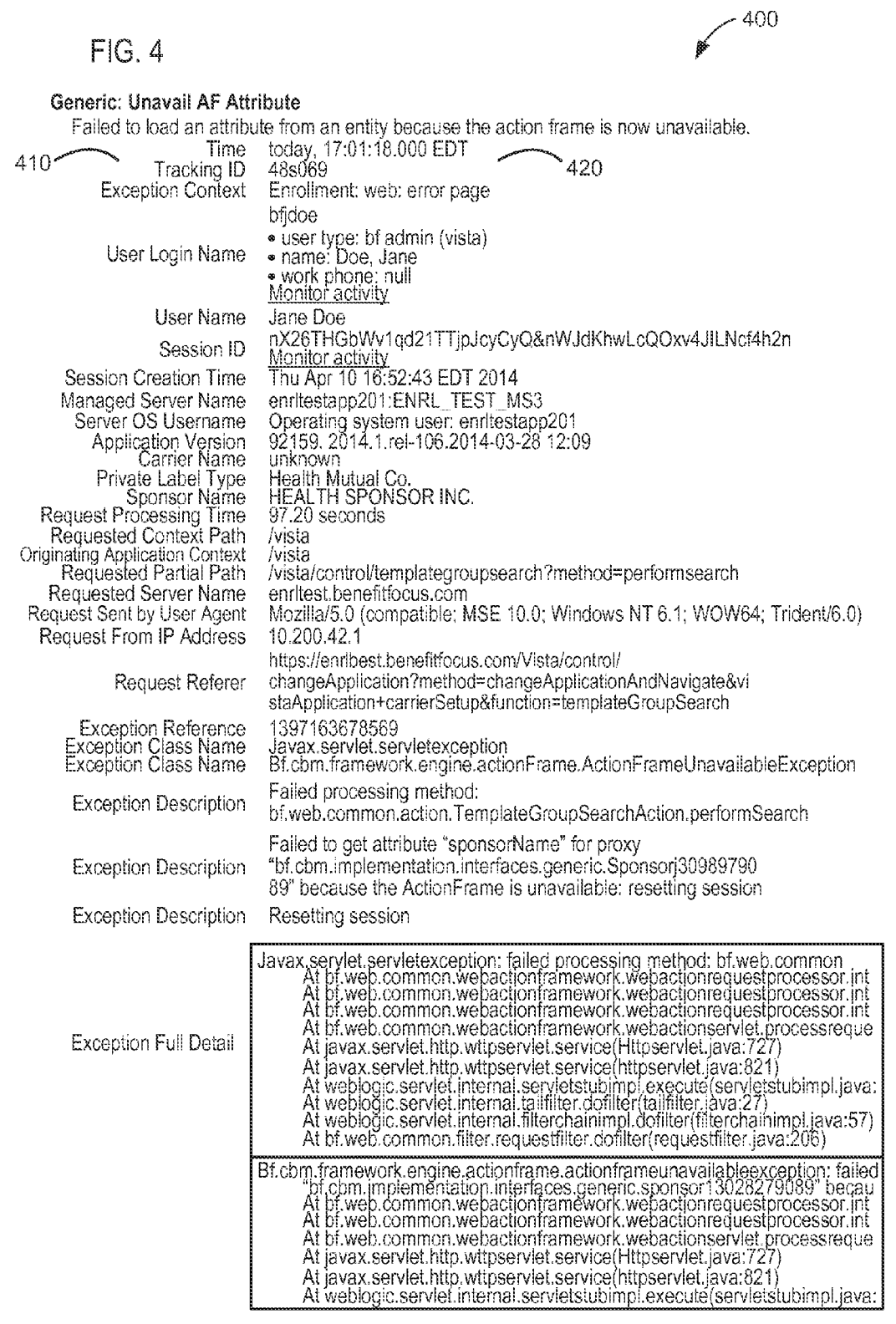

Generic: Unavail AF Attribute

Failed to load an attribute from an entity because the action frame is now unavailable.

410 420

| | |
|---|---|
| Time | today, 17:01:18.000 EDT |
| Tracking ID | 48s069 |
| Exception Context | Enrollment: web: error page |
| User Login Name | bfjdoe<br>• user type: bf admin (vista)<br>• name: Doe, Jane<br>• work phone: null<br>Monitor activity |
| User Name | Jane Doe |
| Session ID | nX26THGbWv1qd21TTjpJcyCyQ&nWJdKhwLcQOxv4JlLNcf4h2n<br>Monitor activity |
| Session Creation Time | Thu Apr 10 16:52:43 EDT 2014 |
| Managed Server Name | enrltestapp201:ENRL_TEST_MS3 |
| Server OS Username | Operating system user: enrltestapp201 |
| Application Version | 92159. 2014.1.rel-106.2014-03-28 12:09 |
| Carrier Name | unknown |
| Private Label Type | Health Mutual Co. |
| Sponsor Name | HEALTH SPONSOR INC. |
| Request Processing Time | 97.20 seconds |
| Requested Context Path | /vista |
| Originating Application Context | /vista |
| Requested Partial Path | /vista/control/templategroupsearch?method=performsearch |
| Requested Server Name | enrltest.benefitfocus.com |
| Request Sent by User Agent | Mozilla/5.0 (compatible: MSE 10.0; Windows NT 6.1; WOW64; Trident/6.0) |
| Request From IP Address | 10.200.42.1 |
| Request Referer | https://enrlbest.benefitfocus.com/Vista/control/<br>changeApplication?method=changeApplicationAndNavigate&vi<br>staApplication+carrierSetup&function=templateGroupSearch |
| Exception Reference | 1397163678569 |
| Exception Class Name | Javax.servlet.servletexception |
| Exception Class Name | Bf.cbm.framework.engine.actionFrame.ActionFrameUnavailableException |
| Exception Description | Failed processing method:<br>bf.web.common.action.TemplateGroupSearchAction.performSearch |
| Exception Description | Failed to get attribute "sponsorName" for proxy<br>"bf.cbm.implementation.interfaces.generic.Sponsorj30989790<br>89" because the ActionFrame is unavailable: resetting session |
| Exception Description | Resetting session |

Exception Full Detail

```
Javax.servlet.servletexception: failed processing method: bf.web.common
        At bf.web.common.webactionframework.webactionrequestprocessor.int
        At bf.web.common.webactionframework.webactionrequestprocessor.int
        At bf.web.common.webactionframework.webactionrequestprocessor.int
        At bf.web.common.webactionframework.webactionservlet.processreque
        At javax.servlet.http.wttpservlet.service(Httpservlet.java:727)
        At javax.servlet.http.wttpservlet.service(httpservlet.java:821)
        At weblogic.servlet.internal.servletstubimpl.execute(servletstubimpl.java:
        At weblogic.servlet.internal.tailfilter.dofilter(tailfilter.java:27)
        At weblogic.servlet.internal.filterchainimpl.dofilter(filterchainimpl.java:57)
        At bf.web.common.filter.requestfilter.dofilter(requestfilter.java:206)
```

```
Bf.cbm.framework.engine.actionframe.actionframeunavailableexception: failed
        "bf.cbm.implementation.interfaces.generic.sponsor13028279089" becau
        At bf.web.common.webactionframework.webactionrequestprocessor.int
        At bf.web.common.webactionframework.webactionrequestprocessor.int
        At bf.web.common.webactionframework.webactionservlet.processreque
        At javax.servlet.http.wttpservlet.service(Httpservlet.java:727)
        At javax.servlet.http.wttpservlet.service(httpservlet.java:821)
        At weblogic.servlet.internal.servletstubimpl.execute(servletstubimpl.java:
```

| Key | Severity | Tags | Description | Edit | View Exceptions |
|---|---|---|---|---|---|
| [Unclassified] | 50 | | Exception does not match any existing classification. This appears to be an exception that has not been previously encountered. | | View Exceptions |
| 1st Possibly Redundant Warning | 1 | • generic | Exception manager provides special support for messages that occur repeatedly; this is the first recent occurrence on this managed server. | Edit | View Exceptions |
| Array Out of Bounds | 30 | • generic | | Edit | View Exceptions |
| Array Out of Bounds: HR Termnt | 30 | | HR termination is encountering a mismatch between the number of elements it expected and the number it received. | Edit | View Exceptions |
| Array Out of Bounds: Load User | 30 | | | Edit | View Exceptions |
| Eurl: Array Out of Bounds | 3 | • Assert-not-seen-by-user | The automated application monitor (eurl) encountered an array out of bounds exception when trying to load user. | Edit | View Exceptions |
| Benefit Program Form | 30 | | | Edit | View Exceptions |
| Bundled Cobra Enrollment Er | 30 | | This is a known bug related to editing/cancelling Cobra enrollments for bundled offers. | Edit | View Exceptions |
| Bundled Cobra Enrollment Err | 30 | | This is a known bug related to editing/cancelling Cobra enrollments for bundled offers. | Edit | View Exceptions |
| Bundled Cobra Enrollment Error | 30 | | This is a known bug related to editing/cancelling Cobra enrollments for bundled offers. | Edit | View Exceptions |
| EmpDtl Report: No Policy Hldr | 30 | | Employee detail report fails if there is no enrolled persons for a particular benefit. | Edit | View Exceptions |
| Assertion Exception | 30 | • generic | | Edit | View Exceptions |
| AE; Carrier Health Statement | 30 | | | Edit | View Exceptions |
| Class Cast Exception | 30 | • generic | The application was expecting an object of a particular type, but received an incompatible type of object. | Edit | View Exceptions |
| Class Cast: BoolCustomQuestion | 30 | • generic | BooleanCustomQuestionSelection | Edit | View Exceptions |
| Class Cast: Change Reason | 30 | • generic | ChangeReasonSelection | Edit | View Exceptions |
| Class Cast: COBRA QualEvt | 30 | • generic | | Edit | View Exceptions |
| Class Cast: Config | 30 | • generic | | Edit | View Exceptions |
| Class Cast: Change Reason Cfg | 30 | | | Edit | View Exceptions |
| Class Cast: Medicare Config | 30 | | | Edit | View Exceptions |

Most Important Exception Subsets by Exception Classification

720

710

730

| | Importance | | | |
|---|---|---|---|---|
| Exception Classification | 24h | 7d | 4w | |
| Request Missing Method | 360<br>12x | 16980<br>566x | 16980<br>566x | Details |
| Null Pointer | 306<br>12x | 7230<br>241x | 7230<br>241x | Details |
| Duplicate Fuse Config. | 0<br>0x | 5040<br>84x | 5040<br>84x | Details |
| Null Pointer Common Action | 696<br>24x | 4901<br>169x | 4901<br>169x | Details |
| Unmatched Web Action: Depends | 90<br>3x | 4620<br>154x | 4620<br>154x | Details |

Exception Billboard 820 830

810

| | Importance | | | | | |
|---|---|---|---|---|---|---|
| Exception Classification | 24h | Today/ Week | Today/ Month | 7d | 4w | |
| JobFarm: Job Not Recongnized | 1410<br>47x | new | new | 1410<br>47x | 1410<br>47x | Details |
| Null Pointer: Common Action | 696<br>24x | Down 1% | Up 347% | 4901<br>169x | 4901<br>169x | Details |
| Plan Rate Service: PlnRtTmpld | 660<br>22x | Up 500+% | Up 500+% | 1170<br>39x | 1170<br>39x | Details |
| Generic: ActionFrame Unavailable | 420<br>12x | Down 31% | Up 209% | 4095<br>117x | 4095<br>117x | Details |
| Request Missing Method | 360<br>12x | Down 87% | Down 42% | 16980<br>566x | 16980<br>566x | Details |
| Null Pointer | 360<br>12x | Down 69% | Up 41% | 7230<br>241x | 7230<br>241x | Details |
| Generic Service Error | 360<br>12x | Up 112% | Up 500+% | 1380<br>46x | 1380<br>46x | Details |
| Concurrent Requests | 290<br>29x | Down 47% | Up 138% | 3580<br>358x | 3580<br>358x | Details |

System Happiness Score

System happiness is a comparison of the importance of exceptions to the number of requests.
The trend periods shown are increments of 24 hours relative to the current time of day.

| | Score | | TI | TR | AS | TU | TE |
|---|---|---|---|---|---|---|---|
| previous 24 hours | 1,231.1 | | 7380 | 90855 | 34 | 68 | 217 |
| 24 hours ago | 1,275.4 | | 6720 | 85708 | 32 | 80 | 205 |
| 2 days ago | 1,734.7 | | 5695 | 98789 | 30 | 65 | 187 |
| 3 days ago | 1,359.2 | | 8840 | 120149 | 30 | 69 | 291 |
| 4 days ago | 3,279.2 | | 355 | 11641 | 29 | 6 | 12 |
| 5 days ago | 2,272.3 | | 465 | 10566 | 31 | 5 | 15 |
| 6 days ago | 1,251.8 | | 4345 | 54392 | 31 | 42 | 140 |
| 7 days ago | 1,203.5 | | 4950 | 59573 | 30 | 60 | 164 |
| 8 days ago | 1,079 | | 7145 | 77096 | 30 | 73 | 236 |

Most Important Exception Subsets by Sponsor Name 1010 1020 1030

| | Importance | | | |
|---|---|---|---|---|
| Sponsor Name | 24h | 7d | 4w | |
| Nadir Products | 1310<br>59x | 20670<br>1082x | 20670<br>1082x | Details |
| Conscious IT Co. | 310<br>11x | 4515<br>160x | 4515<br>160x | Details |
| Seaside Manufacturing Products, Inc. | 295<br>10x | 385<br>13x | 385<br>13x | Details |
| The Passaic Curve | 240<br>8x | 240<br>8x | 240<br>8x | Details |

SYSTEMS AND METHODS FOR CLASSIFYING AND ANALYZING RUNTIME EVENTS

TECHNICAL FIELD

This application relates to systems and methods for storing, classifying, and analyzing events occurring during the runtime of applications.

BRIEF DESCRIPTION OF THE DRAWINGS

FIG. 3 is an exemplary screen display of the program while displaying details about an exception.

FIG. 4 is an exemplary screen display of the program while displaying additional details about the exception.

FIG. 5 is an exemplary screen display of a classification catalog used to classify exceptions.

FIG. 7 is an exemplary screen display of a table showing the importance of various exceptions.

FIG. 8 is an exemplary screen display of a table showing recent changes in the importance of various exceptions.

FIG. 9 is an exemplary screen display of a table showing system happiness scores for various time periods.

FIG. 10 is an exemplary screen display of a table showing the importance of exceptions experienced by various entities.

DETAILED DESCRIPTION OF PREFERRED EMBODIMENTS

Figure 1:
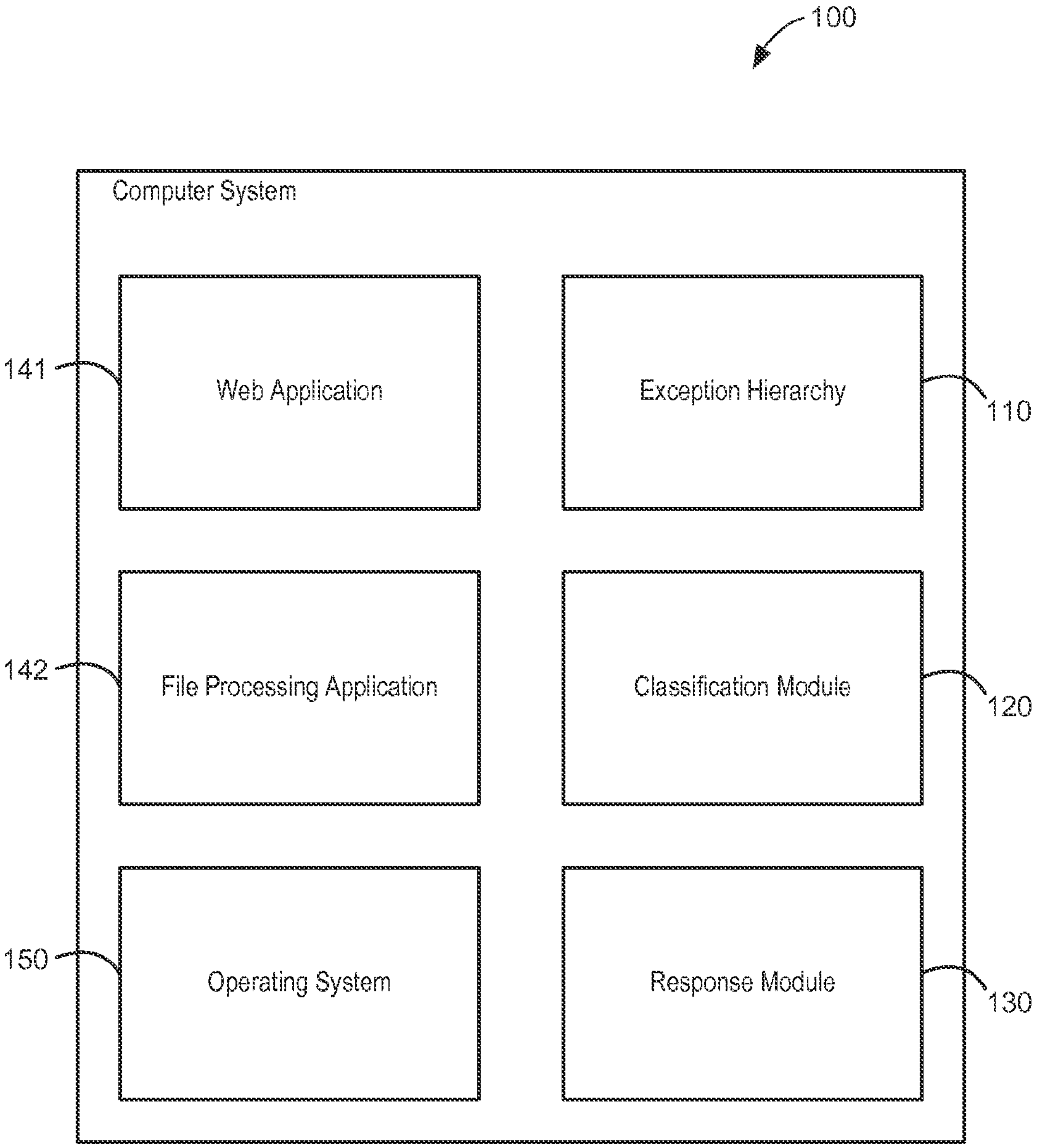
FIG. 1 is a schematic diagram of a computer system according to an embodiment.

A computer system may experience a large number of events while it is operating. For example, the computer system may be accessed by numerous users, each of whom may be running multiple programs capable of experiencing events. The events may include any event that may occur during the runtime of an application. In an embodiment, the events may include or consist of exceptions thrown by the programs. Administrators of the computer system may wish to determine which events are important, which are duplicative, which have known solutions, etc. Many events fit known patterns, but existing systems are unable to respond to the events that they experience in a manner that aids the administrators and users in managing and/or mitigating the events.

To assist in managing and/or mitigating events, a computer system may classify and/or analyze the events. In an embodiment, the computer system may receive an indication of an event and one or more characteristics of the event. The event may be any event with classifiable characteristics that occurs during the runtime of an application, may be an exception, may be any unexpected or atypical event, etc. The computer system may classify the event by comparing the one or more characteristics of the event with characteristics of a plurality of previous events. Based on the comparison, the computer system may classify the event.

The events may be classified into a classification catalog. The classification catalog may be a hierarchical data structure, such as a tree structure. For example, a classification hierarchy may include a root node for unclassified events. Each node other than the root may include characteristics that can be compared to the event to determine the event's similarity with that node. Each node below the root node may be linked to a parent node and zero or more child nodes. Each child of a node other than the root node may include one or more characteristics in common with its parent node. Nodes may also be referred to as classifications and/or classification elements.

New events may be classified by comparing their characteristics with the characteristics of the classification elements in the classification catalog. The similarity of an event with a classification element may be calculated as the number of matching characteristics. The characteristics may be weighted or unweighted. A breadth first and/or a depth first search may be used to find any matching classifications. For example, each classification element below the root node may be compared to the event and only the links connected to matching classification elements may be traversed further. Alternatively, or in addition, the similarity can be calculated by recursively calculating the similarity with the entire chain of parents (e.g., every parent, grandparent, etc.) of a classification element and then adding a calculated similarity with the classification element itself. The recursive calculations can abort when a predetermined number of non-matching characteristics are found (e.g., when the first non-matching characteristic is found).

An event may be matched to a classification element if every characteristic of the classification element, and its parents, matches a characteristic of the event, if more than a predetermined number or percentage of characteristics match, if the classification element is the best match, and/or the like. If no match is found, a new classification element may be automatically created for the event. For example, the new classification element may be created as a child of a closest matching classification. The characteristics associated with the new classification element may be determined by identifying which characteristics specialize the new classification element from its parent. Accordingly, the classification catalog may be able to provide detailed information about events without having to specifically code checks in advance. A classification element may include a title, a description, and an indication of severity. The classification element may include its own characteristics and/or characteristics inherited from its parent. In an embodiment, one or more tags and/or notes may also be added to classification elements. The notes may include research details/notes, indications of related issues, links to bug tracking systems, messages for support personnel to provide to a user experiencing the event, messages to be instantly displayed to the user, contact addresses (e.g., email addresses) to which notifications should be sent, and/or the like.

Each characteristic may include a type and/or a value. The value may be compared with new events when classifying new events. The type may be used, inter alia, to determine the audience for the characteristic (e.g., the access level required to see the characteristic). For example, some characteristics may be visible to users while other may only be visible to administrators. Alternatively, or in addition, the type may determine how much detail is shown for the characteristic (e.g., summary, technical, comprehensive, etc.). The type may include a user login name, a session identifier, an application version, and/or the like.

After an event has occurred, it may be assigned a unique identifier that can be provided to the user. The unique identifier may allow administrators to receive detailed documentation of what happened without requiring a user to be technically adept to describe the problem. The user may only need to provide the unique identifier. The unique identifier may be assigned before and/or after classification of the event. After a match has been found and/or a new classification element created, the event may be persisted based on tags, notes, severity, etc. of the classification element and/or the number of occurrences. The system may also respond to the event by performing an action. For example, one or more classification elements may indicate actions that should be taken if the event is determined to match that classification element. The action may be indicated by a tag and/or a note added to the classification element. In an embodiment, the action may include emailing one or more persons to alert them of the event's occurrence, gathering additional information (e.g., recording a full thread dump), immediately showing a message to the user (e.g., alerting the user to a known solution or workaround), enabling failsafe protections, switching to backup services, and/or the like. The system may not take any action for minor events, and/or a tag may indicate that an event should be ignored as intentional or obsolete.

The system may determine what action to take based on the tags associated with a classification element. The tags may be predetermined and/or defined by an administrative user. The tags may include generic, intentional, fatal to session, email notification, thread dump, user error, switch to backup service, etc. For a classification element tagged as intentional, the system may not save data from matching events to persistent storage. Classification elements associated with events caused by automated testing tools, security penetration tools, and/or the like may be tagged as intentional. Such tools may create numerous events that are not indicative of whether the system is functioning properly. Tags may be used in combination with notes to determine the action taken by the system. For example, a tag may indicate that an email should be sent, and a note may indicate the addresses to which the email should be sent.

The system may take different actions and/or persistent different data depending on the system state, such as the number of occurrences of an event. For example, all characteristics of an event and/or available data may be saved to persistent storage the first time the event occurs, but only logging or recording of statistical information (e.g., the number of times the event has occurred) may be done after the event has occurred a predetermined number of times. Similarly, the number of emails sent may be limited and/or statistical summaries may be emailed if an event occurs frequently. The number of occurrences may be determined as an absolute number of occurrences, as a number of occurrences within a predetermined time frame, and/or the like.

A context for the event (e.g., an exception context) may coordinate with the classification catalog to classify and respond to events. For example, the event context may identify the characteristics that can be recorded based on the kind of event, the information that is available/relevant, and/or the like. For example, an event context for a user request to a web server may tell the classification catalog to record information about the user, session, web browser, etc., and an event context for a file processing job may tell the classification catalog to record the file path, file type, and job identifier.

The classification catalog may notify the event context when an event has been fully processed (e.g., when the event has been classified and any responsive actions have been performed). This callback can be used to track the history of recent events for a particular job, application, user, and/or the like. The history can be documented with future events to help identify when an event may have been impacted or caused by previous events associated with a same user, process, etc. Because the event contexts and the classification catalog are aware of notifications and callbacks, the system may be able to implement automated recovery, monitoring, or notification actions. The system may account for the history of events (e.g., individual events, sets of related events, etc.) and the tags and notes when performing such actions.

For example, the system may watch for classification elements that are tagged as triggering failover to a backup system. The system may determine whether to instruct the event context to failover to the backup system based on additional predetermined criteria. For example, the system may determine whether the number of occurrences of the event in a predetermined time period has exceeded a predetermined threshold. Accordingly, the system can provide nuanced responses to events based on the specific event and the current system state indicated by the history of events. Moreover, proprietary or context-specific features, such as activating an advanced error recovery system or setting a browser cookie, may be implemented as event responses in a general purpose classification system that can be reused in many different systems.

In an embodiment, an event can be wrapped in a stored event context, which may allow multiple event contexts to coordinate together to record characteristics of a complex process causing large numbers of events. As the number of events increases, additional event contexts may be added if available. The events may be recorded in a manner that preserves the relationship and/or chronology of the events. The events can then be easily analyzed together when attempting to diagnose a cause of the events.

The system may include various analysis tools for monitoring the system state and/or analyzing events. For example, each classification element may be associated with a severity value that can be used to differentiate major and minor issues. The severity may be monitored over time. In an embodiment, the importance of an event within a time period may be calculated as the frequency of occurrence multiplied by the assigned severity. The importance may be monitored over one or more time periods and statistics and/or alerts may be provided to administrators. The importance can be used to indicate new, trending, and fixed issues. Holistic results can be detected by monitoring longer time periods, and new important issues can be immediately detected by monitoring shorter time periods. Events may be grouped by classification, user, application, etc. and/or ranked according to importance to show the impact each group and/or classification is having on the system. Events may also, or instead, be grouped by user role, company, etc. to indicate which groups are most impacted by events.

The system may automatically search for additional details that can be acquired about event characteristics. When an event record is viewed, the system may determine whether additional data can be acquired. For example, the system may determine whether user data can be loaded from a persistent storage device, whether data is available from external systems (e.g., session monitoring tools), and/or the like. If the data is available, the system may provide the administrator with the option to view the additional data. The system may also allow the administrator to execute a reclassification of recent events to determine if a new or changed classification element is a better match. The system may consider automatically changed or added classification elements, manually changed or added classification elements, and/or the like when executing the reclassification. Alternatively, or in addition, the system may be able to determine a more efficient organization of the classification catalog than was determined during its ad hoc construction.

Embodiments may include various steps, which may be embodied in machine-executable instructions to be executed by a computer system. A computer system includes one or more general-purpose or special-purpose computers (or other electronic devices). The computer system may include hardware components that include specific logic for performing the steps or may include a combination of hardware, software, and/or firmware.

Embodiments may also be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD ROMs, DVD ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

The network may include communications or networking software, such as the software available from Novell, Microsoft, Artisoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" or wireless protocols known to those of skill in the art. The network may encompass smaller networks and/or be connectable to other networks through a gateway or similar mechanism.

Each computer system includes at least a processor and a memory; computer systems may also include various input devices and/or output devices. The processor may include a general purpose device, such as an Intel®, AMD®, or other "off-the-shelf" microprocessor. The processor may include a special purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer executable code located within a memory device. A software module may, for instance, include one or more physical or logical blocks of computer instructions, which may be organized as a routine, program, object, component, data structure, etc., that perform one or more tasks or implement particular abstract data types.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as: general purpose computers; computer programming tools and techniques; computer networks and networking technologies; digital storage media; authentication; access control; and other security tools and techniques provided by public keys, encryption, firewalls, and/or other means.

FIG. 1 is a schematic diagram of a computer system 100 according to an embodiment. Various programs may be operating on the computer system 100. For example, the computer system 100 may be running an operating system 150, a web application 141, and a file processing application 142. The applications 141, 142 may be configured to throw exceptions when an error or unexpected event occurs. The computer system 100 may be configured to classify and respond to the exceptions thrown by the applications 141, 142.

The computer system 100 may include an exception hierarchy 110. The exception hierarchy 110 may be a data structure configured to classify exceptions. The exception hierarchy 110 may be a tree that includes classification element. Each classification element may include one or more characteristics that can be compared with exceptions to classify the exceptions. The computer system 100 may include a classification module 120. The classification module 120 may be configured to receive exceptions from the applications 141, 142, compare the exceptions to the exception hierarchy 110, and classify the exception based on the results of the comparison. The classification module 120 may traverse the exception hierarchy to determine if any classification elements match the exception. The classification module 120 may be configured to find a best match, to find a match with a similarity above a predetermined threshold, to find a classification element for which all characteristics match (e.g., every characteristic of the classification element matches the exception but the exception may include additional characteristics not included in the classification element), and/or the like. If the exception does not match any classification elements, the classification module 120 may create a new classification element in the exception hierarchy 110. The classification module 120 may persist data from and/or statistical information about the exception, for example, to the exception hierarchy 110. The data and/or statistical information may be accessible by users with administrative privileges to track the state of the computer system 100 and/or review specific exceptions.

The computer system 100 may include a response module 130. The response module 130 may be configured to respond to exceptions thrown by the applications 141, 142. The classification module 120 may indicate the determined classification for the exception to the response module 130. The response module 130 may whether one or more actions should be taken based on the classification of the exception. For example, the classification elements in the exception hierarchy 110 may include tags and/or notes, and the response module 130 may determine whether one or more actions should be taken based on the tags and/or notes. Alternatively, or in addition, the number of occurrences of an exception may be tracked in the exception hierarchy 110, and the response module 130 may determine whether the one or more actions should be taken based on the number of occurrences. The response module 130 may inform the applications 141, 142 and/or the operating system 150 the actions that need to be taken and/or may perform the actions itself. In an embodiment, the response module 130 may notify the applications 141, 142 of the necessary actions through a callback, and the applications 141, 142 may perform the action.

Figure 2:
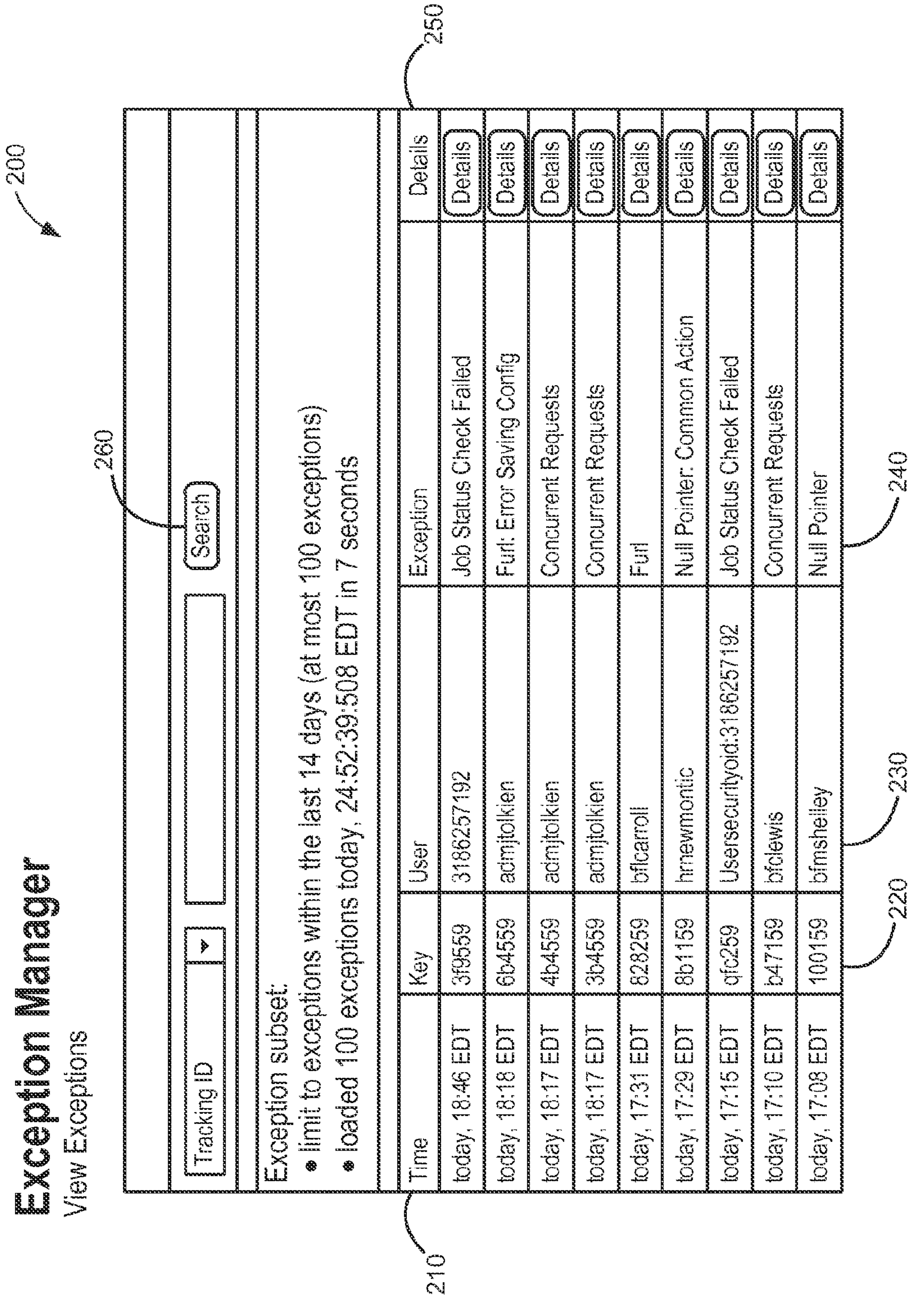
FIG. 2 is an exemplary screen display of a program configured to store characteristics of exceptions.

FIG. 2 is an exemplary screen display 200 of a program configured to store characteristics of exceptions. An administrator may be able to use a search interface 260 to request details about exceptions matching specified criteria. The search interface 260 may compare the specified criteria to persisted exceptions to find matching results. Search results may be displayed to the administrator. The search results may include basic information about exceptions that have occurred. For example, the basic information may include a time 210 when the exception occurred, a key 220 that can be used as a unique tracking identifier for the exception, a user 230 whose actions caused the exception to be thrown, and a brief description 240 of the exception. The administrator may also be able to select a details button 250 to request additional details about a particular exception.

FIG. 3 is an exemplary screen display 300 of the program while displaying details about an exception. A details interface 320 may display details about an exception may be displayed next to a search interface 310. In the illustrated embodiment, an administrator may have requested additional information about an exception record 312 found by the search interface 310. The additional details may include more identifying information about the user, information about an application being operated, information about an entity with whom the user is affiliated, and/or the like. The additional details may include other records 325 of related issues and/or previous occurrences of the exception.

The details interface 320 may include an add details button 321 to allow the administrator to add more details to the exception record 312. The details interface 320 may also include a show more details button 322 and a show all details button 323 that allow the administrator to see additional information about the exception record 312. The administrator may be able to export the details to a bug tracking program by using an export details button 324. In some embodiments, other interfaces may be used rather than the buttons 321-324 to request that the associated action be performed.

FIG. 4 is an exemplary screen display 400 of the program while displaying additional details about the exception. For example, the screen display 400 may be produced in response to a request to view all details of an exception record. The screen display 400 may show all information that has been recorded to persistent storage and is associated with the exception. The screen display 400 may include types 410 for each element of the record as well as the values 420 of each element of the record. An administrator may be able to review the details of the exception record to determine solutions or workarounds.

FIG. 5 is an exemplary screen display 500 of a classification catalog used to classify exceptions. The classification catalog may include a hierarchy of classification elements. In the illustrated embodiment, the hierarchy is indicated by the amount of indentation of the title 510 of each classification element. The classification element for exceptions that cannot otherwise be classified may be the root node. The other classification elements may correspond to categories of exceptions and/or specific exceptions. Each classification element may be associated with a severity 520. The severity may indicate whether the exception is a major issue or not. For example, an unclassified exception may be considered more severe because it has not been encountered before whereas redundant warnings may be considered less severe.

One or more of the classification elements may include tags 530. For example, a generic tag may be used for classification elements that are generic to several possible exceptions. The tags 530 may indicate what action should be taken in response to an exception matching the classification element. The classification elements may be associated with descriptions 540. The descriptions 540 may provide an administrator understandable indication of the exception that occurred.

The exemplary screen display 500 may include an edit button 550 for each classification element other than the root element. The edit button 550 may allow an administrator to edit the classification element and/or to add tags and/or notes to the classification element. The exemplary screen display 500 may include a view exceptions button 560 for each classification element. The view exceptions button 560 may allow the administrator to see all exceptions that have been determined to match that classification element. For example, a listing similar to the one in the screen display 200 may be displayed in response to the view exceptions button 560 being pressed.

Figure 6:
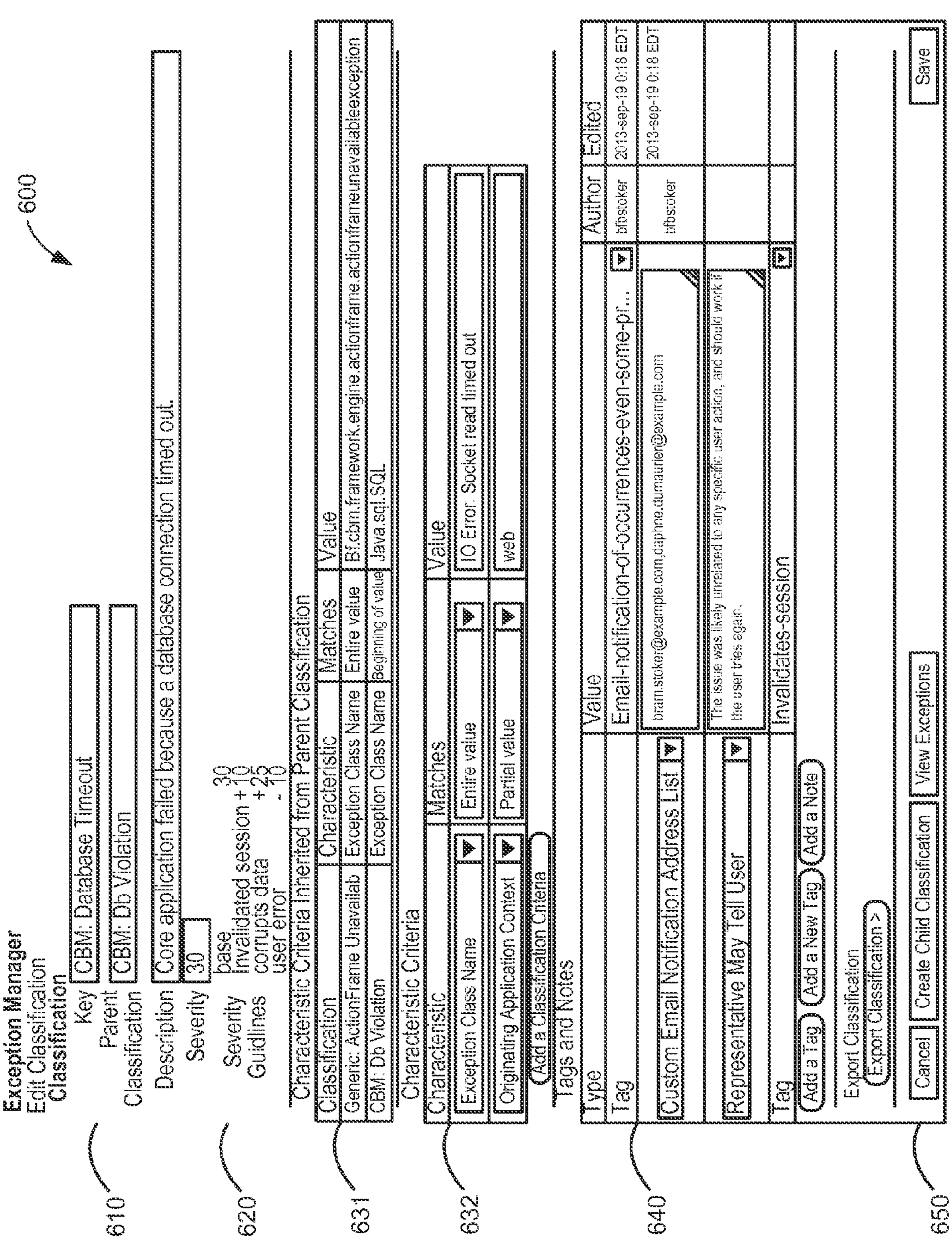
FIG. 6 is an exemplary screen display of an interface for editing a classification element.

FIG. 6 is an exemplary screen display 600 of an interface for editing a classification element. The screen display 600 may be produced in response to an administrator request to edit a classification element. The interface may include editable identification information 610 for the classification element, such as a title, an indication of a parent, a description, and/or the like. The interface may also allow the administrator to edit the severity 620 of the classification element. The interface may include recommended guidelines for the severity to aid the administrator in determining the proper severity to assign to the classification element.

The interface may display the characteristics 631, 632 of the classification element. For example, the interface may display characteristics 631 that have been inherited from one or more parent classification elements. The interface may also display characteristics 632 belonging to the classification element. The characteristics 632 belonging to the classification element may be editable, but the characteristics 631 inherited from the one or more parents may not be editable without editing the parent directly. The administrator may be able to specify how closely the characteristics 632 must match the specified values for the characteristics.

The classification element may include tags and/or notes 640 that can be added, edited, and/or removed through the interface. For example, a tag may indicate that an email notification of the exception should be provided. An associated note may indicate the users to whom the email notification should be sent. An additional note may include instructions for a representative to tell a user if the user asks about the exception. The illustrated classification element may also include a tag indicating that the particular exception invalidates the session. The tag may allow an administrator to quickly determine the behavior of the exception. The interface may also include one or more buttons 650 allowing the administrator to save and/or discard changes, view exceptions matching the classification element, manually create child classification elements, and/or the like.

FIG. 7 is an exemplary screen display 700 of a table showing the importance of various exceptions. The table may indicate classification elements with the highest importance. The importance may be calculated as the severity assigned to a classification element multiplied by the number of exceptions that have been classified as matching the classification element. Accordingly, more severe exceptions and/or exceptions that occur frequently may have a higher importance. The table may include a title 710 and/or a description of the important classification elements. The table may also include the importance 720 of each listed classification element over one or more time periods. By including multiple time periods, an administrator may be able to determine trends, such as detecting new exceptions and/or resolved exceptions. The table may also include details buttons 730 that allow the administrator to view additional information about the classification elements listed in the table and/or the corresponding exceptions.

FIG. 8 is an exemplary screen display 800 of a table showing recent changes in the importance of various exceptions. The recent changes in the importance may provide additional information on trends. The table may include the title 810 and/or description of important classification elements. The table may also include the importance 820 of the classification elements, which may be expressed as absolute importance and/or change in importance. The change in importance may be calculated by comparing the importance across different time periods (e.g., the importance today vs. the importance over the past week or four weeks). The table may again include details buttons 830 that allow the administrator to view additional information about classification elements listed in the table and/or the corresponding exceptions.

FIG. 9 is an exemplary screen display 900 of a table showing system happiness scores 920 for various time periods 910. The system happiness score 920 may be a comparison of the total importance of exceptions 941 with the total number of requests 942 received from users. For example, in the illustrated embodiment, the score may be computed as 100 multiplied by total number of requests 942 divided by the total importance of exceptions 941. The table may list recent time periods 910 and may include a numerical 920 and a graphical representation 930 of the system happiness score. The table may also include various statistics such as the total importance 941, the total requests 942, the average severity 943, the number of unique users experiencing exceptions 944, the total exception occurrences 945, etc. for each time period. The table may give a quick indication to administrators of the system health over the various time periods 910.

FIG. 10 is an exemplary screen display 1000 of a table showing the importance of exceptions experienced by various entities. The system may be able to analyze experienced exceptions across various categories. For example, the system may determine which entities have users experiencing exceptions with the highest importance. The table may list the name of each entity 1010 entity experiencing exceptions with high importance. The table may also indicate the importance 1020 of the exceptions being experienced. The table may include details buttons 1030 that allow the administrator to view additional information about the exceptions being experienced by a corresponding entity. The table may allow administrators to determine which customers are experiencing the most problems so the administrators can direct resources to fixing the problems for those customers and keeping the customers happy.

Figure 11:
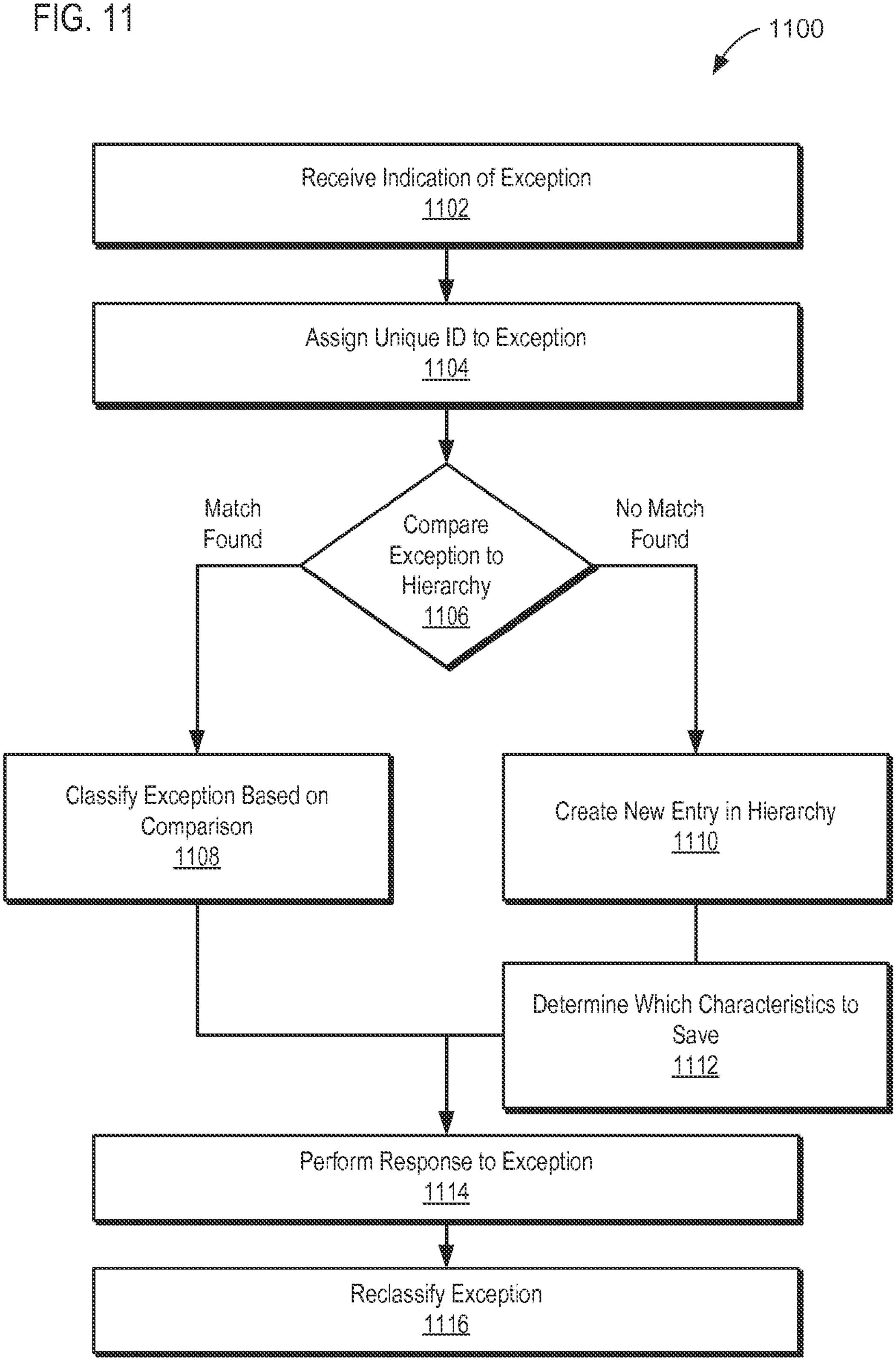
FIG. 11 is a flow diagram of a method of classifying exceptions.

FIG. 11 is a flow diagram of a method 1100 of classifying exceptions. The method 1100 may begin when an indication of an exception is received 1102 from an application. The indication of the exception may include characteristics of the exception, a user, the application, and/or the like. A unique identifier may be assigned 1104 to the exception. The unique identifier may be provided to the user and/or may be sent to the application so it can be provided to the user. The unique identifier may be specific to the particular occurrence of the exception; a new occurrence even slightly later may be assigned a different unique identifier.

The exception may be compared 1106 to a hierarchy of classification elements. The comparison may include comparing the characteristics of the exception are similar to the characteristics of each classification element and its parents. If each characteristic in the classification element is similar to a corresponding characteristic of the exception, a match may be declared. Alternatively, or in addition, a match may be found if more than predetermined number or percentage of characteristics match, and/or a classification element with a largest number of similar characteristics may be declared a match. The classification element may include fewer characteristics than the exception, so only characteristics with a corresponding counterpart may be considered when determining whether there is a match.

If a match is found, the exception may be classified 1108 based on the comparison. Exception characteristics may be persisted to a storage device based on the classification element. If a match is not found, a new entry may be created 1110 in the hierarchy. The characteristics that specialize the exception from existing classification elements may be determined 1112, and a new classification element containing those characteristics may be automatically added to the hierarchy. Exception characteristics may be persisted to a storage device.

An action may be performed 1114 to respond to the exception. For example, one or more persons may be notified of the exception, an automated recovery may be performed, a failover to a backup system may be performed, and/or the like. The action may be indicated by the tags and/or notes associated with a classification element. Alternatively, or in addition, the tags and/or notes may indicate that responsive action should not be performed for a particular exception. Performing 1114 the action may include indicating to the application throwing the exception that a particular action should be taken.

In some embodiments, a request to reclassify 1116 the exception may be received. For example, an administrator may have changed one or more classification elements and/or one or more classification elements may be newly added. Accordingly, reclassifying 1116 may include trying to determine a better match, which may not have existed previously, for an exception. Based on the reclassification, additional responsive actions may be taken and/or the characteristics of the exception may be persisted to a different logical or physical location of a storage device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for classifying runtime events, the system comprising:
- a processor; and
- a memory in communication with the processor, the memory storing instructions which when executed by the processor cause the processor to:
  - receive an indication of an event and one or more characteristics of the event, wherein the event occurs during a runtime of an application and wherein the one or more characteristics include context for the event;
  - compare the one or more characteristics of the event with characteristics of a plurality of previously classified events by traversing a predefined hierarchical data structure comprising the characteristics of the plurality of previously classified events, wherein each set of characteristics corresponding to one of the plurality of previously classified events is a data entry;
  - assign a classification to the event based on the comparison;
  - identifying a tag associated with the number of events previously classified similarly to the classification; and
  - perform an action within the system, at the time of the event, based on the tag associated with the classification of the event.

2. The system of claim 1, wherein the event comprises an exception.

3. The system of claim 1, wherein a hierarchy comprises the plurality of previously classified events, and wherein the instructions cause the processor to classify the event by traversing the hierarchy according to the one or more characteristics.

4. The system of claim 3, wherein the instructions cause the processor to create a new entry in the hierarchy in response to determining the event does not match a previously classified event.

5. The system of claim 4, wherein the instructions cause the processor to determine which characteristics to save to the new entry based on the kind of event.

6. The system of claim 1, wherein the instructions cause the processor to assign a unique identifier to the event, and display the unique identifier to a user.

7. The system of claim 1, wherein each of the one or more characteristics includes a type and a value, and wherein user access to view a characteristic is determined based on the type.

8. The system of claim 1, wherein the instructions cause the processor to receive an indication of a second event, determine the second event is intentional, and ignore the second event without classifying it.

9. The system of claim 1, wherein the instructions cause the processor to receive a user request to reclassify the event.

10. A method of classifying runtime events, the method comprising:
- receiving an indication of an event and one or more characteristics of the event, wherein the event occurs during a runtime of an application and wherein the one or more characteristics include context for the event;
- comparing the one or more characteristics of the event with characteristics of a plurality of classification elements by traversing a predefined hierarchical data structure comprising the characteristics of the plurality of classification elements, wherein each set of characteristics corresponding to one of the plurality of classification elements is a data entry;
- assigning a classification to the event based on the comparison; and
- identifying a tag associated with the number of events previously classified similarly to the classification
- performing an action within the system, at the time of the event, based on the tag associated with the classification of the event.

11. The method of claim 10, wherein a tree structure comprises the plurality of previously classified events, and wherein comparing the one or more characteristics of the event with the characteristics of the plurality of classification elements comprises searching the tree structure for a matching classification element.

12. The method of claim 11, wherein classifying the event comprises creating a new entry in the tree structure in response to determining the event does not match any of the plurality of classification elements.

13. The method of claim 12, wherein classifying the event comprises determining which characteristics to save to the new entry for classifying future events.

14. The method of claim 10, further comprising performing an action in response to the event based on the classification of the event.

15. The method of claim 13, wherein further comprising determining which action to perform based on one or more tags and/or notes associated with the classification element.

16. The method of claim 10, further comprising notifying an event context that the event has been fully processed.

17. The method of claim 10, further comprising assigning a unique identifier to the event, and instructing the application to display the unique identifier to a user.

18. A non-transitory computer readable storage medium comprising program code configured to cause a processor to perform a method of classifying runtime events, the method comprising:

receiving an indication of an event associated with an application and one or more characteristics of the event, wherein the one or more characteristics include context for the event;

classifying the event based on a comparison with a classification data structure by traversing the classification data structure comprising characteristics of a plurality of classification elements, wherein each set of characteristics corresponding to one of the plurality of classification elements is a data entry;

identify a tag associated with one or more classification elements classified similarly to a classification of the event; and performing an action indicated by the classification data structure via the tag associated with the classification data structure at the time of the event.

* * * * *